US012223897B2

(12) United States Patent
Pyun et al.

(10) Patent No.: US 12,223,897 B2
(45) Date of Patent: Feb. 11, 2025

(54) DISPLAY DEVICE HAVING A DRIVING VOLTAGE CONTROLLER AND METHOD OF DRIVING THE SAME

(71) Applicant: Samsung Display Co., Ltd., Yongin-Si (KR)

(72) Inventors: Kihyun Pyun, Gwangmyeong-si (KR); Sung-Mo Yang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/124,044

(22) Filed: Mar. 21, 2023

(65) Prior Publication Data

US 2023/0351963 A1 Nov. 2, 2023

(30) Foreign Application Priority Data

May 2, 2022 (KR) ........................ 10-2022-0054185

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0842* (2013.01); *G09G 2310/08* (2013.01); *G09G 2320/0271* (2013.01); *G09G 2330/021* (2013.01); *G09G 2330/025* (2013.01); *G09G 2330/028* (2013.01); *G09G 2330/12* (2013.01)

(58) Field of Classification Search
CPC ............... G09G 3/3233; G09G 3/2096; G09G 2330/021; G09G 2330/025; G09G 2330/028; G09G 2330/12
See application file for complete search history.

(56) References Cited

U.S. PATENT DOCUMENTS 11,024,242 B1 * 6/2021 Lin ...................... G09G 3/3611
2018/0308448 A1 * 10/2018 Lee .......................... H03K 5/24
2021/0049954 A1 * 2/2021 Lee ...................... G09G 3/3406

FOREIGN PATENT DOCUMENTS

KR 10-0303439 B1 11/2001
KR 10-0634158 B1 10/2006

* cited by examiner

*Primary Examiner* — Lisa S Landis
(74) *Attorney, Agent, or Firm* — Innovation Counsel LLP

(57) ABSTRACT

A display device may include a display panel displaying an image and including pixels, a driving voltage controller including an overcurrent detector generating an alert signal when a driving current of the display panel is greater than a reference current, a load calculator calculating a load of input image data in response to the alert signal and generating a load escape signal when the load is greater than a reference load, a vertical blank counter generating a vertical blank count value by counting a time of a vertical blank period in response to the alert signal and the load escape signal, and generating a counter escape signal when the vertical blank count value is greater than a reference count value, and a driving voltage generator altering a driving voltage provided to the display panel in response to the alert signal and the counter escape signal.

17 Claims, 13 Drawing Sheets

DISPLAY DEVICE HAVING A DRIVING VOLTAGE CONTROLLER AND METHOD OF DRIVING THE SAME

CROSS-REFERENCE TO RELATED APPLICATION(S)

This application claims priority under 35 USC § 119 to Korean Patent Application No. 10-2022-0054185 filed on May 2, 2022, in the Korean Intellectual Property Office (KIPO), the entire disclosure of which is incorporated by reference herein.

BACKGROUND

1. Field

Embodiments relate to a display device. More particularly, embodiments relate to a display device applied to various electronic apparatuses and a method of driving the same.

2. Description of the Related Art

A display device may include a display panel including pixels. A driving current flowing through the display panel may be proportional to a luminance of an image displayed by the display device. When the driving current decreases in order to reduce power consumption of the display device, the luminance of the image may also decrease.

A driving voltage provided to the display panel may be proportional to the driving current. When the driving current excessively increases, the driving voltage may decrease to decrease the driving current.

However, when the driving voltage having a relatively low voltage level is provided to the display panel for a long time, the driving current having a relatively low current level may flow through the display panel for a long time. In this case, the display device may display an image with a low luminance for a long time.

SUMMARY

Embodiments provide a display device for improving quality of an image and a method of driving the display device.

A display device according to embodiments may include a display panel displaying an image based on output image data which is converted input image data, and including a plurality of pixels, a driving voltage controller including an over current detector generating an alert signal when a driving current of the display panel is greater than a reference current, a load calculator calculating a load of the input image data in response to the alert signal and generating a load escape signal when the load is greater than a reference load, a vertical blank counter generating a vertical blank count value by counting a time of a vertical blank period of a frame period that includes an active period and the vertical blank period in response to the alert signal and the load escape signal, and generating a counter escape signal when the vertical blank count value is greater than a reference count value, and a driving voltage generator decreasing a driving voltage provided to the display panel from a high voltage level to a low voltage level in response to the alert signal, and increasing the driving voltage in response to the counter escape signal.

In an embodiment, when the alert signal is generated in a first frame period, the vertical blank period may be included in a second frame period following the first frame period.

In an embodiment, a length of the vertical blank period may be altered according to a refresh rate of the display panel.

In an embodiment, the driving voltage generator may increase the driving voltage from the low voltage level to the high voltage level in response to the counter escape signal.

In an embodiment, the driving voltage generator may increase the driving voltage from the low voltage level to an intermediate voltage level between the low voltage level and the high voltage level in response to the counter escape signal, and may increase the driving voltage from the intermediate voltage level to the high voltage level when the vertical blank period ends.

In an embodiment, the driving voltage controller may further include a driving voltage code generator generating a driving voltage code for decreasing the driving voltage in response to the alert signal, and generating the driving voltage code for increasing the driving voltage in response to the counter escape signal.

In an embodiment, the vertical blank counter may detect a start of the vertical blank period based on a data enable signal.

In an embodiment, the display device may further include a power controller calculating the load of the input image data, and calculating a scale factor based on the load, and a timing controller generating the output image data by scaling grayscale values of the input image data using the scale factor.

In an embodiment, the power controller may calculate the scale factor based on a load of input image data in a first frame period. The timing controller may scale grayscale values of input image data in a second frame period following the first frame period using the scale factor.

In an embodiment, the driving current may be a sum of currents flowing through light emitting elements respectively included in the pixels. The driving voltage may be provided to the light emitting elements.

A display device according to embodiments may include a display panel displaying an image based on output image data which is converted input image data, and including a plurality of pixels, a driving voltage controller including an over current detector generating an alert signal when a driving current of the display panel is greater than a reference current, a load calculator calculating a load of the input image data in response to the alert signal and generating a load escape signal when the load is greater than a reference load, a sensing period detector detecting a sensing period in a vertical blank period of a frame period that includes an active period and the vertical blank period in response to the alert signal, and generating a sensing end signal when the sensing period ends, and a driving voltage generator decreasing a driving voltage provided to the display panel from a high voltage level to a low voltage level in response to the alert signal, and increasing the driving voltage in response to the load escape signal and the sensing end signal.

In an embodiment, when the alert signal is generated in a first frame period, the vertical blank period may be included in a second frame period following the first frame period.

In an embodiment, a length of the vertical blank period may be altered according to a refresh rate of the display panel.

In an embodiment, the driving voltage generator may increase the driving voltage from the low voltage level to the high voltage level in response to the load escape signal and the sensing end signal.

In an embodiment, the driving voltage generator may increase the driving voltage from the low voltage level to an intermediate voltage level between the low voltage level and the high voltage level in response to the load escape signal and the sensing end signal, and may increase the driving voltage from the intermediate voltage level to the high voltage level when the vertical blank period ends.

In an embodiment, the driving voltage controller may further include a driving voltage code generator generating a driving voltage code for decreasing the driving voltage in response to the alert signal, and generating the driving voltage code for increasing the driving voltage in response to the load escape signal and the sensing end signal.

In an embodiment, the display device may further include a sensing circuit measuring sensing currents of the pixels during the sensing period.

A method of driving a display device according to embodiments may include generating an alert signal when a driving current of a display panel is greater than a reference current, decreasing a driving voltage provided to the display panel in response to the alert signal, calculating a load of input image data in response to the alert signal, and generating a load escape signal when the load is greater than a reference load, generating a vertical blank count value by counting a time of a vertical blank period of a frame period that includes an active period and the vertical blank period in response to the alert signal and the load escape signal, and generating a counter escape signal when the vertical blank count value is greater than a reference count value, and increasing the driving voltage in response to the counter escape signal.

In an embodiment, when the alert signal is generated in a first frame period, the vertical blank period may be included in a second frame period following the first frame period.

In an embodiment, a length of the vertical blank period may be altered according to a refresh rate of the display panel.

In the display device and the method of driving the display device according to the embodiments, the driving voltage may increase when the time of the vertical blank period elapses by a predetermined time or when the sensing period in the vertical blank period ends after the driving voltage decreases, so that a driving current having a relatively low current level may not flow through the display panel for a long time. Accordingly, a time in which the display device displays an image with a low luminance may decrease, and quality of an image displayed by the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
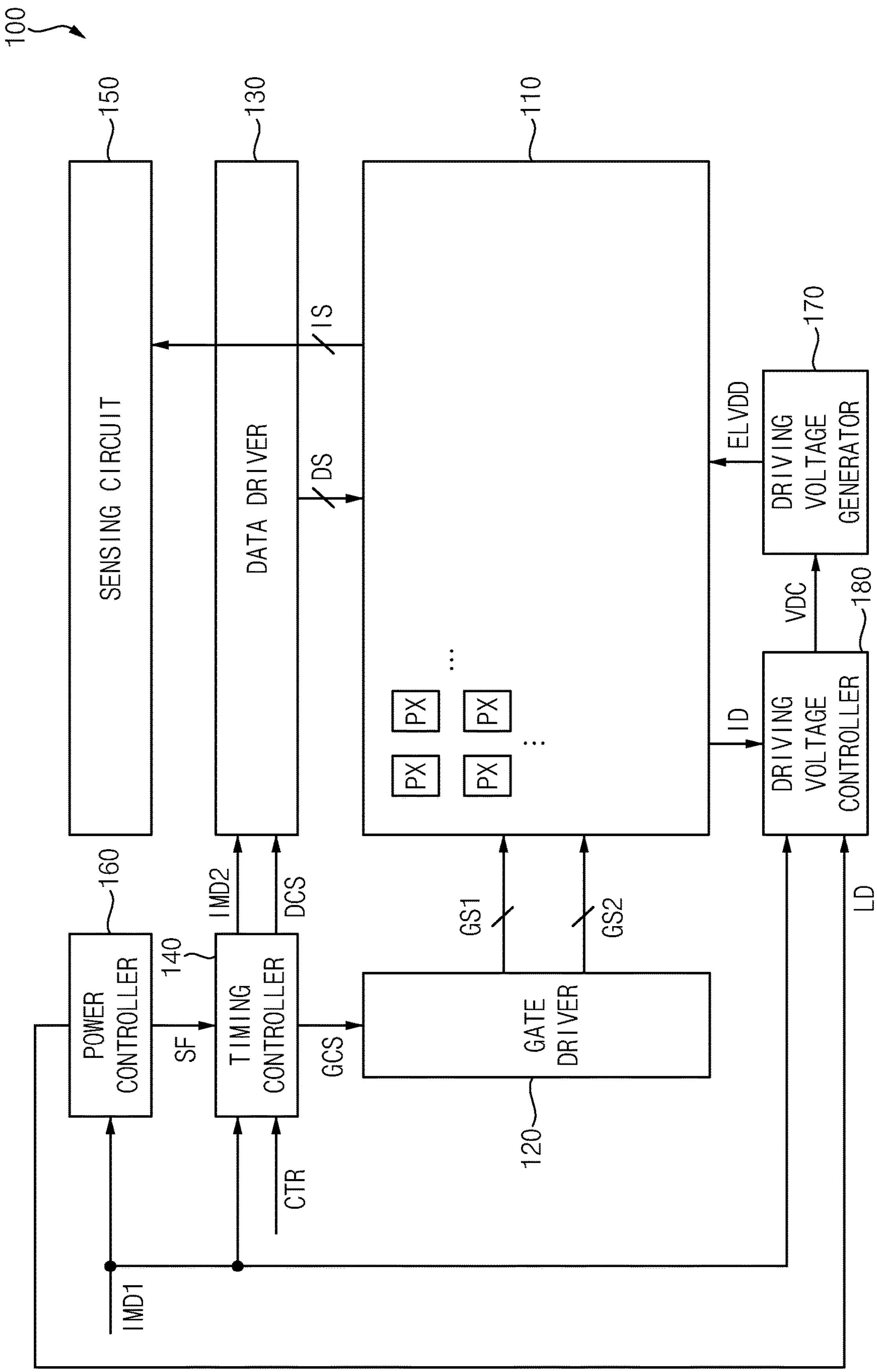
FIG. 1 is a block diagram illustrating a display device according to an embodiment.

Hereinafter, a display device and a method of driving a display device according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment.

Referring to FIG. 1, the display device 100 may include a display panel 110, a gate driver 120, a data driver 130, a timing controller 140, a sensing circuit 150, a power controller 160, a driving voltage generator 170, and a driving voltage controller 180.

The display panel 110 may display an image based on output image data IMD2. The display panel 110 may include various display elements such as organic light emitting diode (OLED) or the like. Hereinafter, the display panel 110 including the organic light emitting diode as a display element will be described for convenience. However, the present disclosure is not limited thereto, and the display panel 110 may include various display elements such as a liquid crystal display (LCD) element, an electrophoretic display (EPD) element, an inorganic light emitting diode, a quantum dot light emitting diode, or the like.

The display panel 110 may include a plurality of pixels PX. Each of the pixels PX may be electrically connected to a data line DL, gate lines GL1 and GL2, and a sensing line SL as disclosed in FIG. 2. Further, each of the pixels PX may be electrically connected to a driving voltage line VDDL and a common voltage line VSSL disclosed in FIG. 2, and may receive a driving voltage ELVDD and a common voltage from the driving voltage line VDDL and the common voltage line VSSL, respectively. The pixel PX will be described with reference to FIG. 2.

The gate driver 120 may generate first gate signals GS1 and second gate signals GS2 in response to a gate control signal GCS, and may provide the first gate signals GS1 and the second gate signals GS2 to the display panel 110. The gate control signal GCS may include a gate start signal STV disclosed in FIG. 3, a gate clock signal GCK disclosed in FIG. 3, or the like.

The data driver 130 may generate data signals DS based on the output image data IMD2 and a data control signal DCS, and may provide the data signals DS to the display panel 110. The output image data IMD2 may include grayscale values respectively corresponding to the pixels PX. The data control signal DCS may include a data start signal, a data clock signal, or the like.

The timing controller 140 may control a driving of the gate driver 120 and a driving of the data driver 130. The timing controller 140 may generate the output image data IMD2, the gate control signal GCS, and the data control signal DCS based on input image data IMD1, a scale factor SF, and a control signal CTR. The input image data IMD1 may include grayscale values respectively corresponding to the pixels PX. The control signal CTR may include a vertical synchronization signal, a horizontal synchronization signal, a clock signal, a data enable signal DE disclosed in FIG. 6, or the like.

The timing controller 140 may convert the input image data IMD1 into the output image data IMD2 using the scale factor SF. In an embodiment, the timing controller 140 may generate the output image data IMD2 by scaling grayscale values included in the input image data IMD1 using the scale factor SF.

The sensing circuit 150 may measure sensing currents IS of the pixels PX to perform a sensing operation on the pixels PX. Information about characteristics of the pixels PX such as a threshold voltage and a mobility of a first transistor T1 disclosed in FIG. 2 of each of the pixels PX, a threshold voltage of a light emitting element EL disclosed in FIG. 2 of each of the pixels PX, etc. may be collected through the sensing currents IS.

The power controller 160 may calculate a load LD of the input image data IMD1, and may calculate the scale factor SF using the load LD of the input image data IMD1. The power controller 160 may provide the scale factor SF to the timing controller 140. The power controller 160 will be described with reference to FIG. 4.

The driving voltage generator 170 may decrease or increase the driving voltage ELVDD based on a driving voltage code VDC received from the driving voltage controller 180, and may provide the driving voltage ELVDD to the display panel 110.

The driving voltage controller 180 may detect a driving current ID of the display panel 110, and may calculate the load LD of the input image data IMD1 or may receive the load LD of the input image data from the power controller 160. The driving voltage controller 180 may provide the driving voltage code VDC for decreasing or increasing the driving voltage ELVDD to the driving voltage generator 170. The driving voltage controller 180 will be described with reference to FIGS. 6 to 11.

Figure 2:
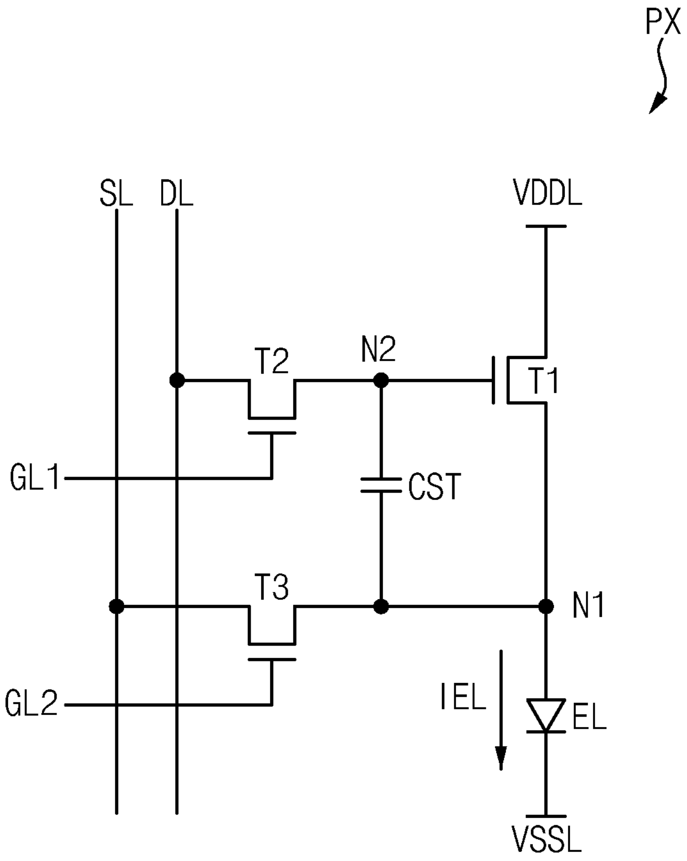
FIG. 2 is a circuit diagram illustrating a pixel included in the display device in FIG. 1.

FIG. 2 is a circuit diagram illustrating the pixel PX included in the display device 100 in FIG. 1.

Referring to FIG. 2, the pixel PX may include a first transistor T1, a second transistor T2, a third transistor T3, a storage capacitor CST, and a light emitting element EL.

The first transistor T1 may provide a current IEL to the light emitting element EL. A first electrode of the first transistor T1 may be connected to the driving voltage line VDDL that transmits the driving voltage ELVDD, and a second electrode of the first transistor T1 may be connected to a first node N1. A gate electrode of the first transistor T1 may be connected to a second node N2.

The second transistor T2 may be turned on in response to the first gate signal GS1 to provide the data signal DS to the second node N2. A first electrode of the second transistor T2 may be connected to a data line DL, and a second electrode of the second transistor T2 may be connected to the second node N2. A gate electrode of the second transistor T2 may be connected to a gate line GL1 and receive the first gate signal GS1.

The third transistor T3 may be turned on in response to the second gate signal GS2 to connect a sensing line SL to the first node N1. A first electrode of the third transistor T3 may be connected to the sensing line SL, and a second electrode of the third transistor T3 may be connected to the first node N1. A gate electrode of the third transistor T3 may be connected to a gate line GL2 and receive the second gate signal GS2.

The storage capacitor CST may maintain a voltage between the first node N1 and the second node N2. A first electrode of the storage capacitor CST may be connected to the first node N1, and a second electrode of the storage capacitor CST may be connected to the second node N2.

The light emitting element EL may emit light based on the current IEL provided from the first transistor T1. A first electrode of the light emitting element EL may be connected to the first node N1, and a second electrode of the light emitting element EL may be connected to the common voltage line VSSL that transmits the common voltage.

The driving current ID of the display panel 110 may be the sum of the currents IEL flowing through the light emitting elements EL respectively included in the pixels PX. When the first transistor T1 is turned on, the driving voltage ELVDD may be applied to the first node N1, and accordingly, the driving voltage ELVDD may be provided to the light emitting element EL.

Figure 3:
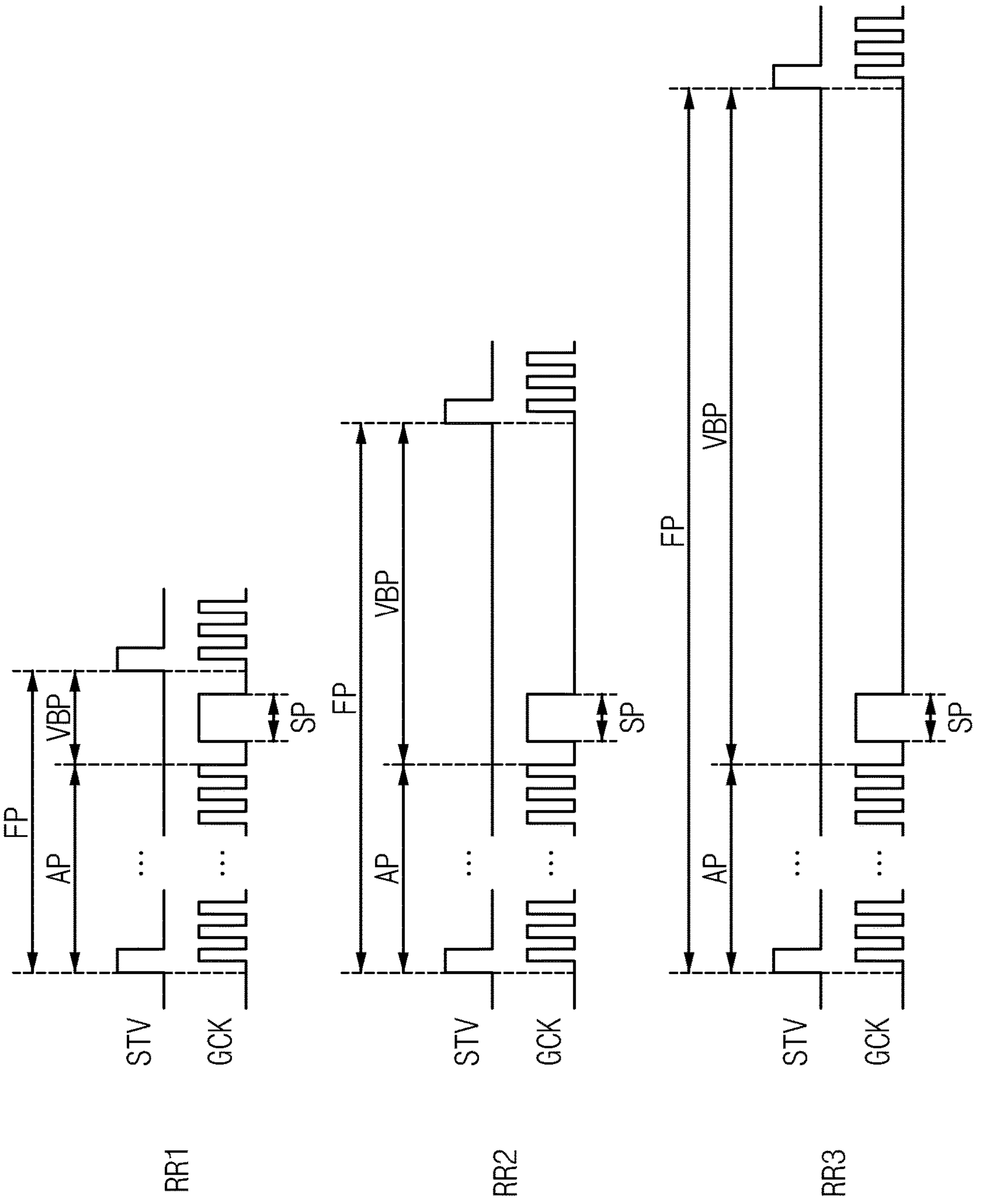
FIG. 3 is a diagram for describing a method of driving the display device in FIG. 1.

FIG. 3 is a diagram for describing a method of driving the display device 100 in FIG. 1.

Referring to FIG. 3, a frame period FP in which the display panel 110 displays one image frame may include an active period AP and a vertical blank period VBP. A length of the frame period FP may be a period between adjacent the gate start signals STY.

The display panel 110 may display an image using a variable refresh rate (VRR) method capable of changing a refresh rate. The refresh rate may indicate the number of times per second that an image refreshes on the display panel 110. An output frequency of the gate driver 120 and an output frequency of the data driver 130 may be adjusted according to driving conditions of the display panel 110.

A length of the vertical blank period VBP may be altered according to the refresh rate of the display panel 110. A length of the vertical blank period VBP when the display panel 110 is driven at a first refresh rate RR1 (e.g., 144 Hz) may be less than a length of the vertical blank period VBP when the display panel 110 is driven at a second refresh rate RR2 (e.g., 60 Hz). Further, a length of the vertical blank period VBP when the display panel 110 is driven at a third refresh rate RR3 (e.g., 44 Hz) may be greater than the length of the vertical blank period VBP when the display panel 110 is driven at the second refresh rate RR2.

A length of the active period AP may be constant regardless of the refresh rate of the display panel 110. A length of the active period AP when the display panel 110 is driven at the first refresh rate RR1, a length of the active period AP when the display panel 110 is driven at the second refresh rate RR2, and a length of the active period AP when the display panel 110 is driven at the third refresh rate RR3 may be equal to each other. Accordingly, the length of the frame period FP may be adjusted by adjusting the length of the vertical blank period VBP according to the refresh rate.

In the active period AP, the gate driver 120 may sequentially provide the first gate signals GS1 and the second gate signals GS2 corresponding to the gate start signal STV to pixel rows based on the gate clock signal GCK, the data driver 130 may provide the data signals DS for image display to the pixel row selected by the first gate signals GS1 and the second gate signals GS2, and the pixels PX may emit light with luminance corresponding to the data signals DS.

The vertical blank period VBP may include a sensing period SP. In the sensing period SP, the gate driver 120 may provide the first gate signal GS1 and the second gate signal GS2 to at least one pixel row based on the gate clock signal GCK, the data driver 130 may provide the data signals DS for characteristic sensing of the pixels PX, and the sensing circuit 140 may measure the sensing currents IS of the pixels PX generated based on the data signals DS through the sensing lines SL. Although the length of the vertical blank period VBP changes according to the refresh rate of the display panel 110, a length of the sensing period SP may not change.

Figure 4:
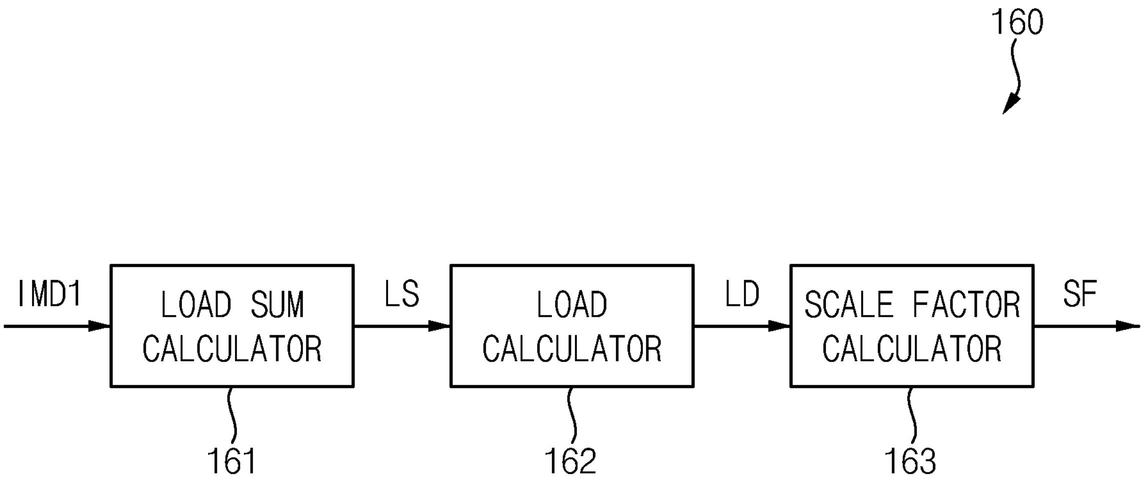
FIG. 4 is a block diagram illustrating a power controller included in the display device in FIG. 1.

FIG. 4 is a block diagram illustrating the power controller 160 included in the display device 100 disclosed in FIG. 1.

Referring to FIG. 4, the power controller 160 may include a load sum calculator 161, a load calculator 162, and a scale factor calculator 163.

The load sum calculator 161 may calculate a load sum LS of the input image data IMD1. The load sum LS of the input image data IMD1 may be a sum of grayscale values included in the input image data IMD1 of one frame.

The load calculator 162 may calculate a load LD of the input image data IMD1 using the load sum LS of the input image data IMD1. The load LD of the input image data IMD1 may be a percent ratio of the load sum LS of the input image data IMD1 to a maximum load sum. In an embodiment, the load LD of the input image data IMD1 may be 0% when an input image corresponding to the input image data IMD1 is a full black image, and the load LD of the input image data IMD1 may be 100% when an input image corresponding to the input image data IMD1 is a full white image.

The scale factor calculator 163 may calculate the scale factor SF based on the load LD of the input image data IMD1. The scale factor SF may have a value less than or equal to one. For example, the scale factor SF may be 1 when the load LD has a value between a minimum load (e.g., 0%) and a reference load, and the scale factor SF may decrease as the load LD increases when the load LD has a value greater than the reference load.

The power controller 160 may provide the scale factor SF to the timing controller 140, and the timing controller 140 may scale the grayscale values of the input image data IMD1 using the scale factor SF, so that currents IEL flowing through the pixels PX may decrease. Accordingly, power consumption of the display device 100 which is proportional to the driving current ID may be reduced.

A delay of one frame period FP may occur while the power controller 160 calculates the scale factor SF from the input image data IMD1. When the power controller 160 calculates the scale factor SF based on the load LD of the input image data IMD1 in a first frame period FP1 disclosed in FIG. 5, the timing controller 140 may generate the output image data IMD2 by scaling grayscale values of the input image data IMD1 in a second frame period FP2 disclosed in FIG. 5 following the first frame period FP1 using the scale factor SF calculated from the input image data IMD1 in the first frame period FP'.

Figure 5:
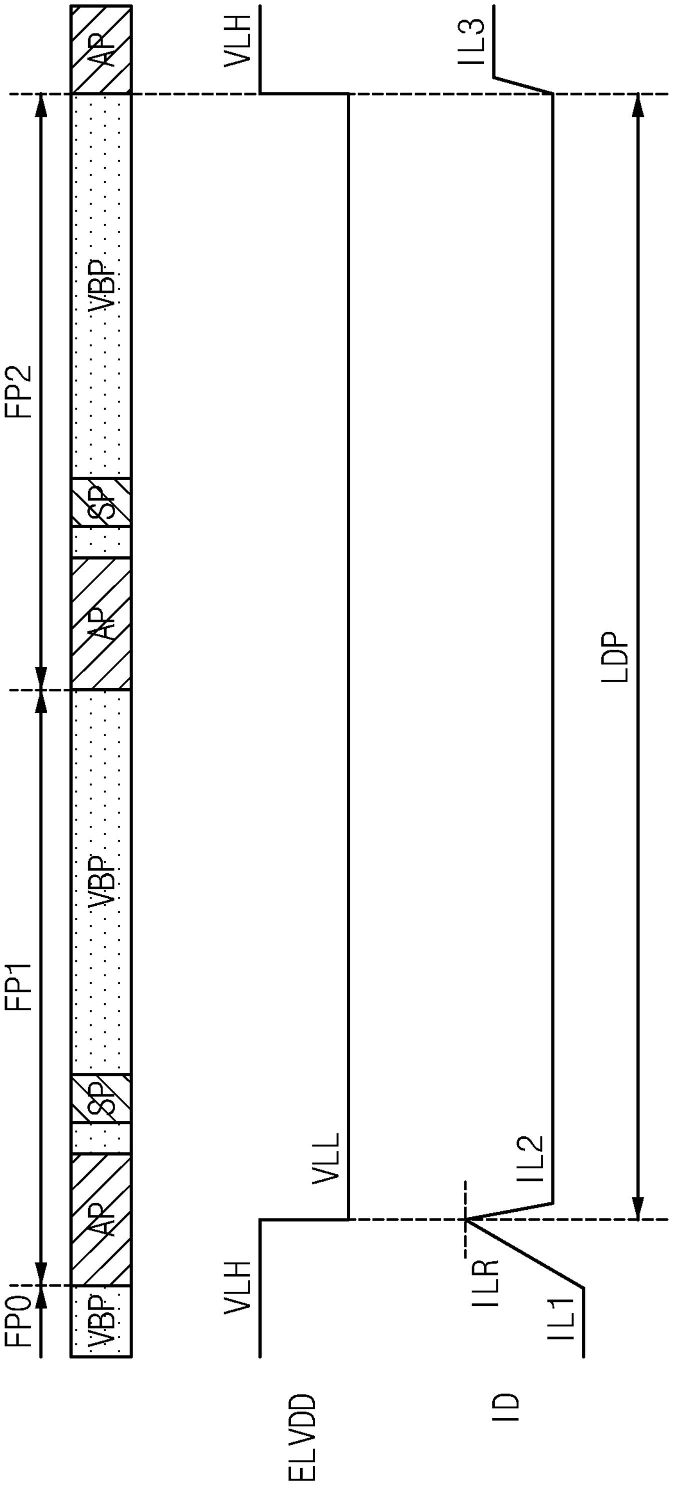
FIG. 5 is a timing diagram illustrating a driving voltage and a driving current according to a comparative example.

For example, when the input image data IMD1 has grayscale values corresponding to a full black image in a $0^{th}$ frame period FP0 disclosed in FIG. 5 before the first frame period FP1, and the input image data IMD1 has grayscale values corresponding to a full white image in the first frame period FP1 and the second frame period FP2, the power controller 160 may output a scale factor SF having 1 in the $0^{th}$ frame period FP0, and may output a scale factor SF having a value less than 1 in the first frame period FP1. As described above, since the delay of one frame period FP occurs in the process of calculating the scale factor SF, the timing controller 140 may generate the output image data IMD2 of the first frame period FP1 by scaling grayscale values of the input image data IMD1 in the first frame period FP1 using the scale factor SF having 1 which is generated using a load LD of the $0^{th}$ frame period FP0, and may generate the output image data IMD2 of the second period FP2 by scaling grayscale values of the input image data IMD1 in the second frame period FP2 using the scale factor SF having a value less than 1 which is generated using a load LD of the first frame period FP1. Since grayscale values of the output image data IMD2 generated in the first frame period FP1 are scaled using the scale factor SF having 1, the driving current ID of the display panel 110 may increase in the first frame period FP1, and accordingly, an overcurrent may flow through the display panel 110 in the first frame period FP1.

FIG. 5 is a timing diagram illustrating a driving voltage ELVDD and a driving current ID according to a comparative example.

Referring to FIG. 5, in a comparative example, in order to prevent an overcurrent from flowing through the display panel 110, when the driving current ID of the display panel 110 is greater than a reference current level ILR, the driving voltage ELVDD may decrease. For example, when the driving current ID increases from a first current level IL1 to a reference current level ILR, the driving voltage ELVDD may decrease from a high voltage level VLH to a low voltage level VLL, and accordingly, the driving current ID may decrease from the reference current level ILR to a second current level IL2 to maintain the driving current ID less than the reference current level ILR.

Since grayscale values of the output image data IMD2 generated in the second frame period FP2 are scaled using the scale factor SF of the first frame period FP1 having a value less than 1, the driving current ID of the display panel 110 may maintain a value less than the reference current level ILR. Accordingly, the driving voltage ELVDD may increase when the vertical blank period VBP of the second frame period FP2 ends. For example, when the vertical blank period VBP of the second frame period FP2 ends, the driving voltage ELVDD may increase from the low voltage level VLL to the high voltage level VLH, and accordingly, the driving current ID may increase from the second current level IL2 to a third current level IL3 corresponding to the output image data IMD2 generated in the second frame period FP2.

When the driving voltage ELVDD decreases, an overcurrent in the display panel 110 may be prevented, however, as the driving voltage ELVDD and the driving current ID decrease, a luminance of an image displayed by the display device 100 may decrease. A period in which a decreased driving voltage ELVDD is provided to the display panel 110 may be referred to as a luminance decreased period LDP.

As described above, the length of the vertical blank period VBP may be altered according to the refresh rate of the display panel 110. In the comparative example, when the length of the vertical blank period VBP increases due to a decrease in the refresh rate, a length of the luminance decreased period LDP may increase, and quality of an image displayed by the display device 100 may be degraded as the display device 100 displays an image with a low luminance for a long time.

Figure 6:
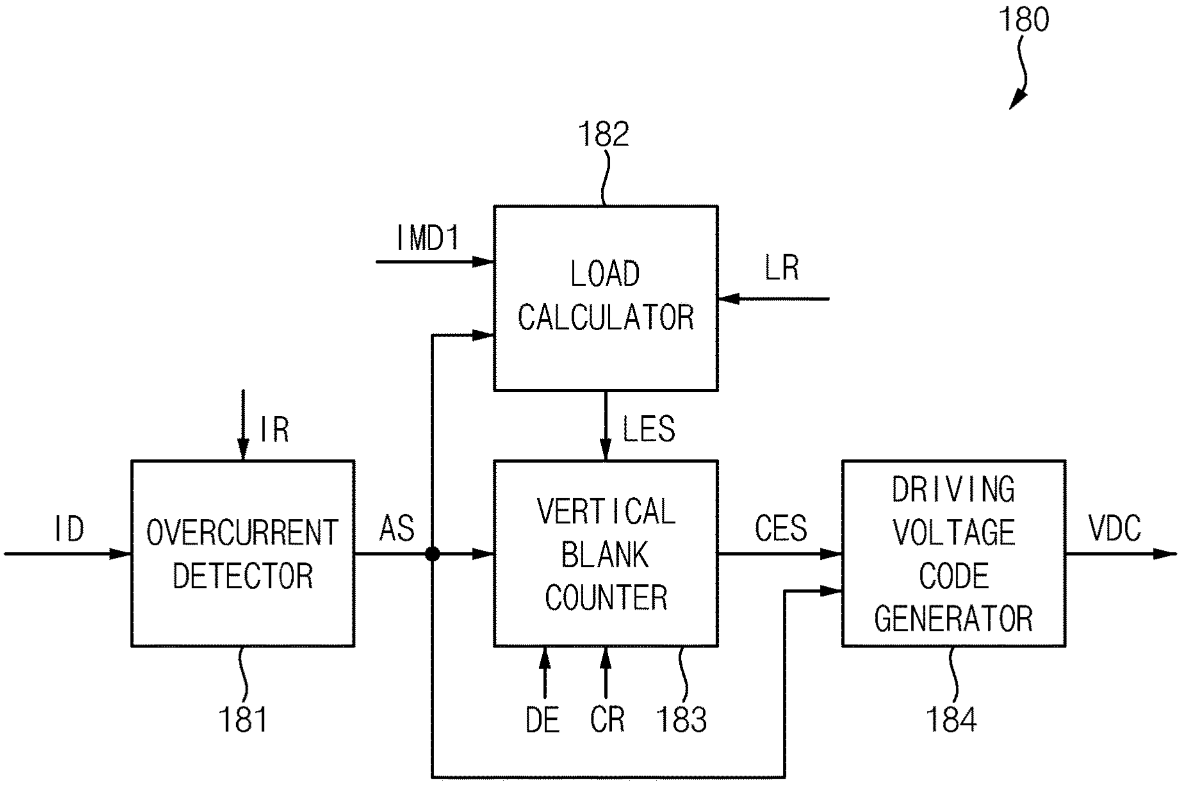
FIG. 6 is a block diagram illustrating a driving voltage controller according to an embodiment.
Figure 7:
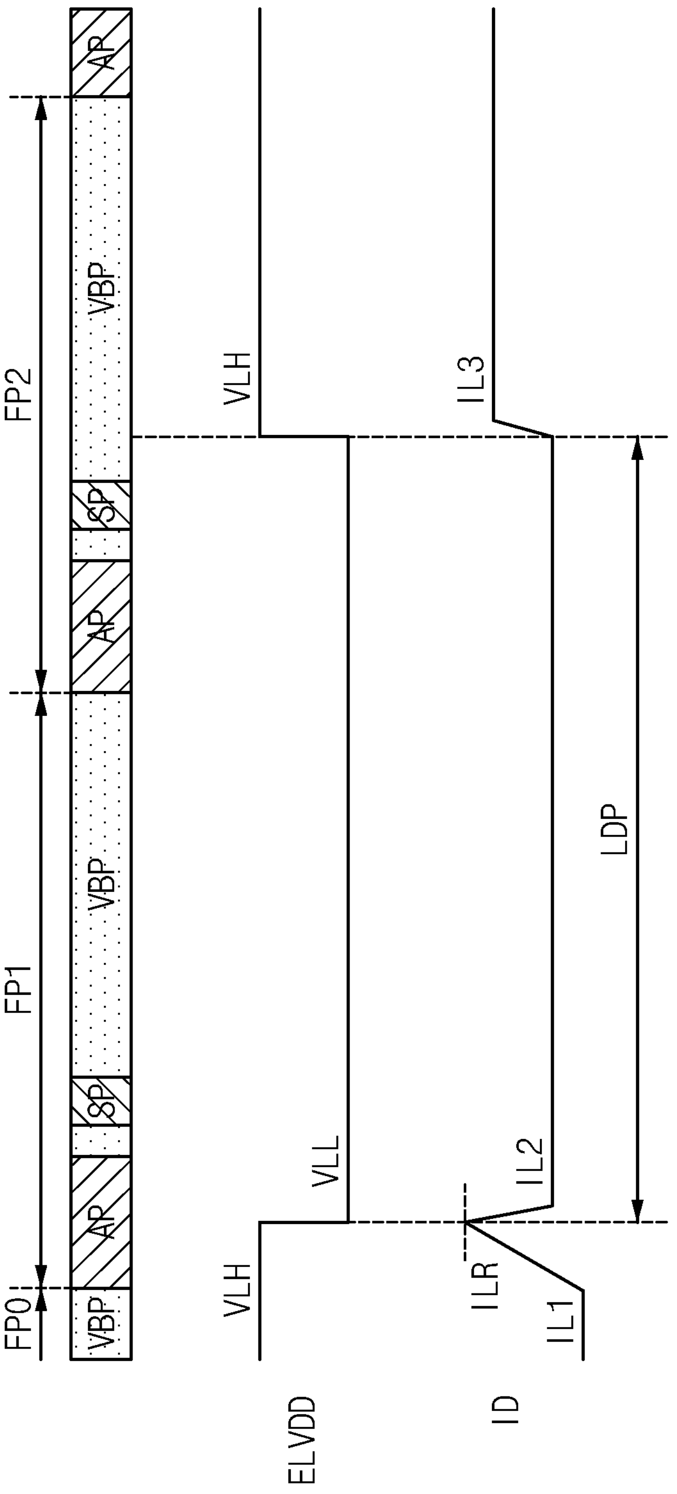
FIGS. 7 and 8 are timing diagrams illustrating a driving voltage and a driving current according to an embodiment.
Figure 8:
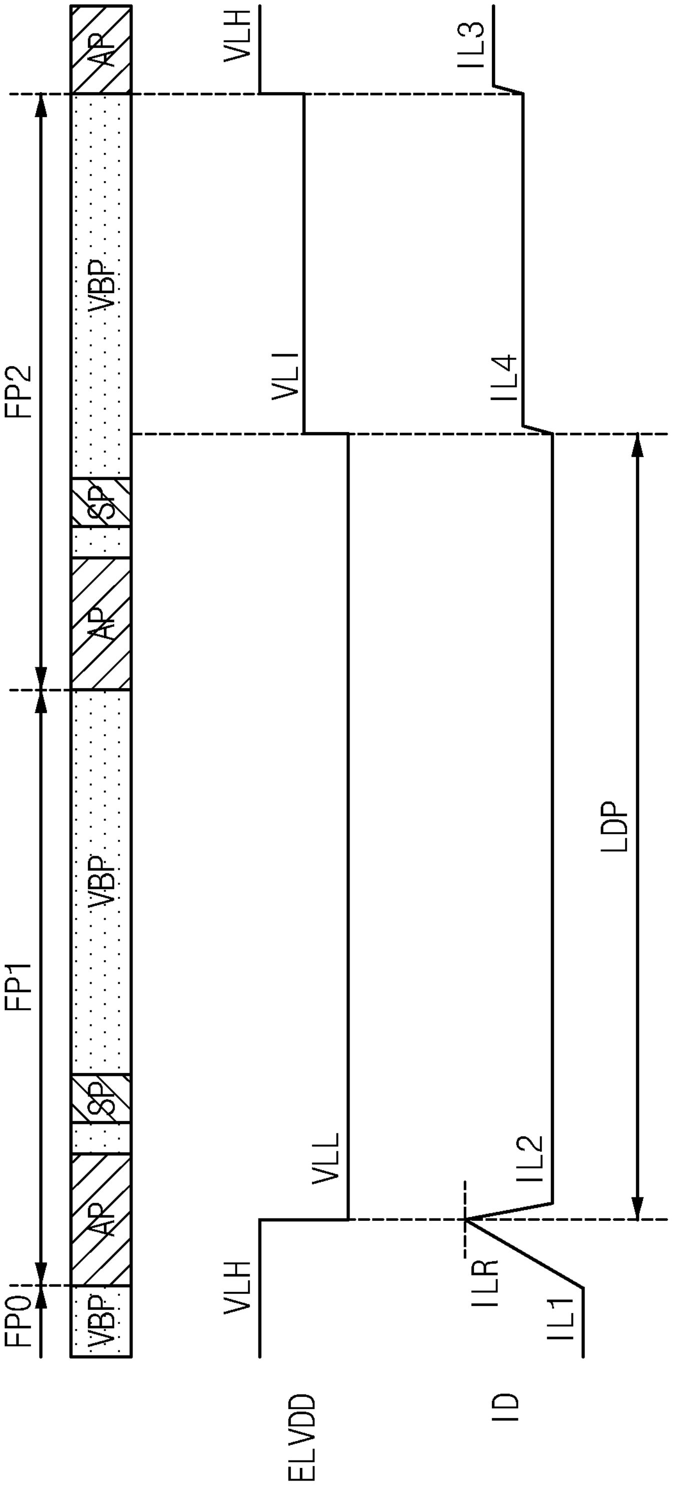

FIG. 6 is a block diagram illustrating the driving voltage controller 180 according to an embodiment. FIGS. 7 and 8 are timing diagrams illustrating a driving voltage ELVDD and a driving current ID according to an embodiment.

Referring to FIGS. 6, 7, and 8, the driving voltage controller 180 may include an overcurrent detector 181, a load calculator 182, a vertical blank counter 183, and a driving voltage code generator 184.

The overcurrent detector 181 may detect the driving current ID of the display panel 110. For example, the overcurrent detector 181 may detect the driving current ID through a wiring that provides the driving voltage ELVDD to the display panel 110. The overcurrent detector 181 may generate an alert signal AS when the driving current ID is greater than a reference current IR. The reference current IR may be a reference for determining whether or not an overcurrent flows through the display panel 110. For example, when the driving current ID is greater than the reference current IR, it may be determined that an overcurrent flows through the display panel 110.

The load calculator 182 may calculate the load LD of the input image data IMD1 or may receive the load LD from the power controller 160 in response to the alert signal AS. The load calculator 182 may generate a load escape signal LES when the load LD is greater than a reference load LR. The reference load LR may be a reference for determining whether or not the driving voltage ELVDD increases. For example, when the load LD of the input image data IMD1 is greater than the reference load LR, it may be determined that the load LD of the input image data IMD1 is large, and the driving voltage ELVDD may increase to display an image with a high luminance.

The vertical blank counter 183 may generate a vertical blank count value by counting the time of the vertical blank period VBP in response to the alert signal AS and the load escape signal LES. The vertical blank counter 183 may detect the start of the vertical blank period VBP based on the data enable signal DE. For example, the data enable signal DE may be inactivated in the vertical blank period VBP.

The vertical blank counter 183 may generate a counter escape signal CES when the vertical blank count value is greater than a reference count value CR. The reference count value CR may be a time interval for increasing the driving voltage ELVDD before the end of the vertical blank period VBP regardless of the length of the vertical blank period VBP. Accordingly, the reference count value CR may be less than the length of the vertical blank period VBP.

When the alert signal AS is generated by the overcurrent detector 181 in the first frame period FP1, the vertical blank period VBP counted by the vertical blank counter 183 may be a vertical blank period VBP in the second frame period FP2 following the first frame period FP1. For example, when the overcurrent detector 181 detects a driving current ID greater than the reference current IR in the active period AP of the first frame period FP1 and generates the alert signal AS, the vertical blank counter 183 may generate the counter escape signal CES by counting the time of the vertical blank period VBP of the second frame period FP2.

The driving voltage code generator 184 may generate a driving voltage code VDC for decreasing the driving voltage ELVDD in response to the alert signal AS. The driving voltage generator 170 may decrease the driving voltage ELVDD from the high voltage level VLH to the low voltage level VLL based on the driving voltage code VDC generated in response to the alert signal AS.

The driving voltage code generator 184 may generate a driving voltage code VDC for increasing the driving voltage ELVDD in response to the counter escape signal CES. The driving voltage generator 170 may increase the driving voltage ELVDD based on the driving voltage code VDC generated in response to the counter escape signal CES. When the driving voltage ELVDD increases, the driving current ID may increase.

In an embodiment, as illustrated in FIG. 7, the driving voltage generator 170 may increase the driving voltage ELVDD from the low voltage level VLL to the high voltage level VLH based on the driving voltage code VDC generated in response to the counter escape signal CES. In other words, the driving voltage generator 170 may increase the driving voltage ELVDD from the low voltage level VLL to the high voltage level VLH in one step. When the driving voltage ELVDD increases from the low voltage level VLL to the high voltage level VLH, the driving current ID may increase from the second current level IL2 to the third current level IL3.

In another embodiment, as illustrated in FIG. 8, the driving voltage generator 170 may increase the driving voltage ELVDD from the low voltage level VLL to an intermediate voltage level VLI based on the driving voltage code VDC generated in response to the counter escape signal CES, and may increase the driving voltage ELVDD from the intermediate voltage level VLI to the high voltage level VLH when the vertical blank period VBP of the second frame period FP2 ends. In other words, the driving voltage generator 170 may increase the driving voltage ELVDD from the low voltage level VLL to the high voltage level VLH in two steps. The intermediate voltage level VLI may be a voltage level between the low voltage level VLL and the high voltage level VLH. When the driving voltage ELVDD increases from the low voltage level VLL to the intermediate voltage level VLI and then increases to the high voltage level VLH, the driving current ID may increase from the second current level IL2 to a fourth current level IL4, and then may increase to the third current level IL3.

In the driving voltage controller 180 according to the embodiment described with reference to FIGS. 6 to 8, the driving voltage ELVDD may increase after a predetermined time elapses from a time point when the driving voltage ELVDD decreases, so that the length of the luminance decreased period LDP may be constant regardless of the length of the vertical blank period VBP, which is altered according to the refresh rate, and the length of the luminance decreased period LDP may not excessively increase. Accordingly, quality of the image displayed by the display device 100 may be improved.

Figure 9:
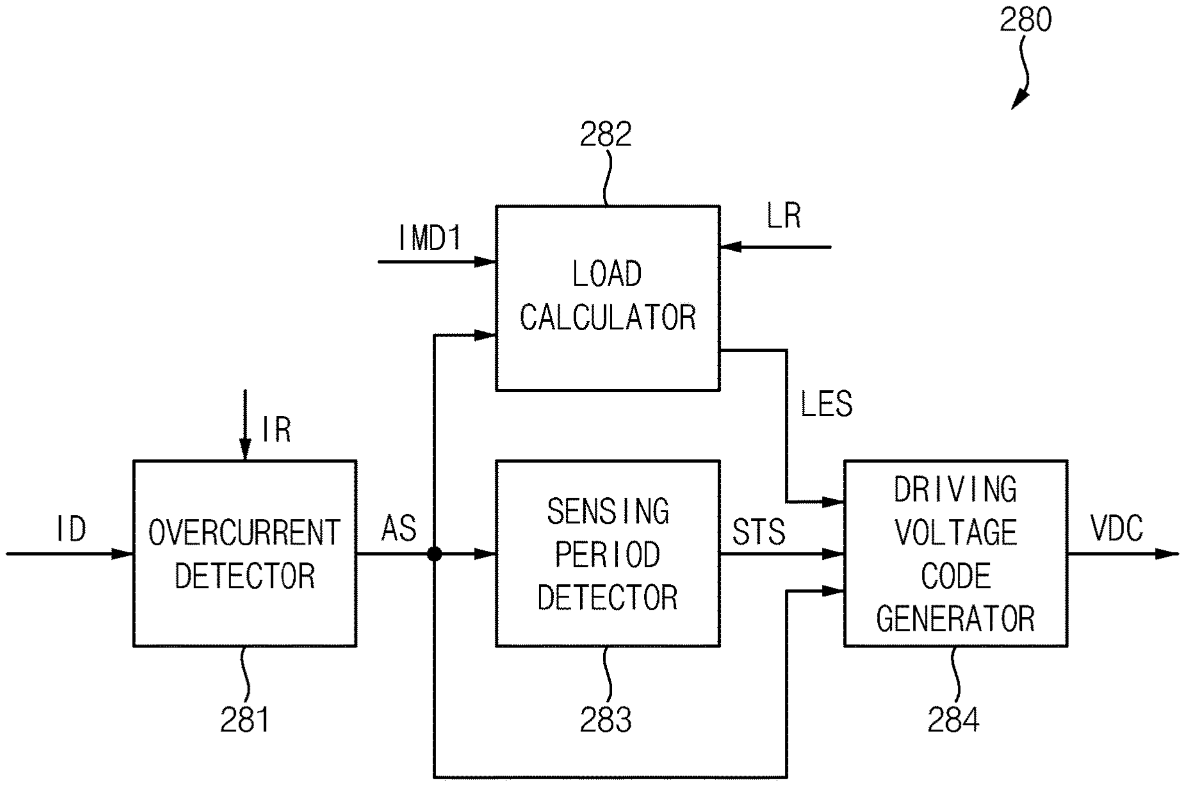
FIG. 9 is a block diagram illustrating a driving voltage controller according to an embodiment.
Figure 10:
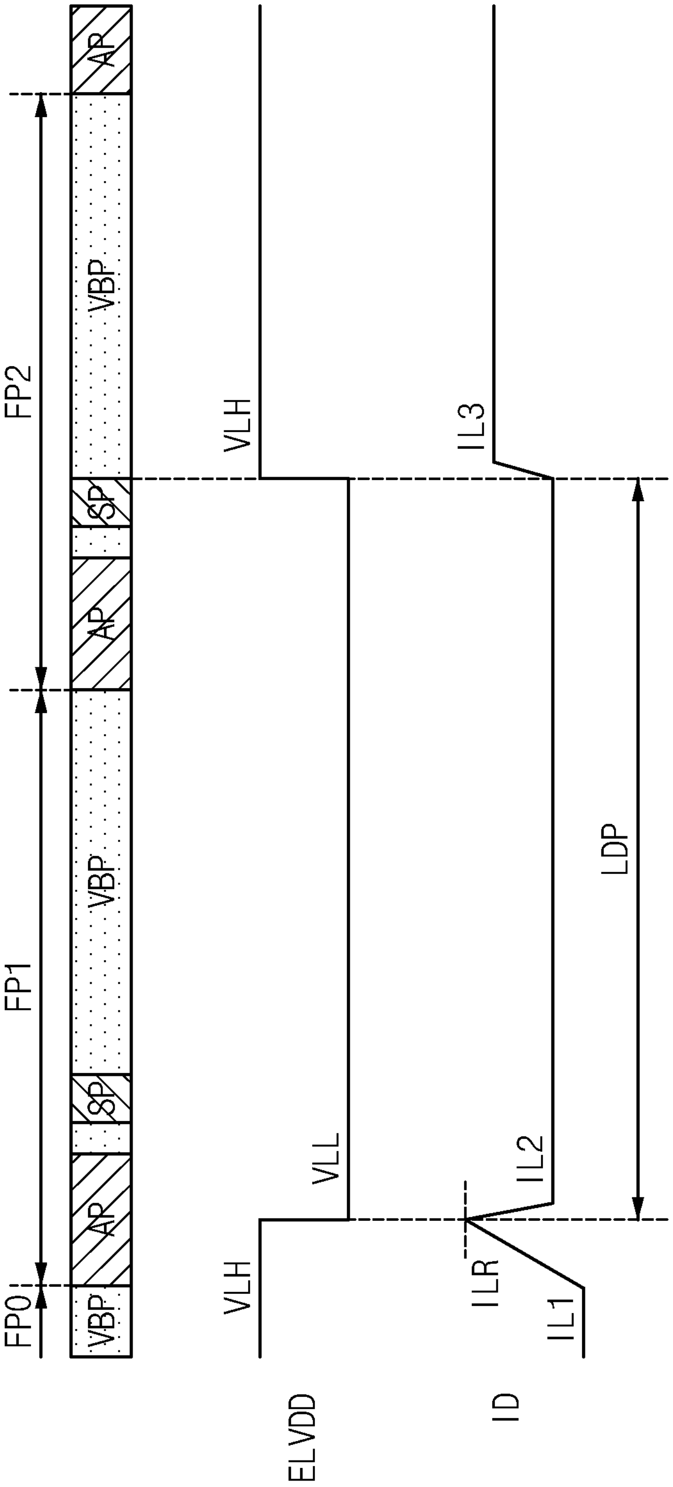
FIGS. 10 and 11 are timing diagrams illustrating a driving voltage and a driving current according to an embodiment.
Figure 11:
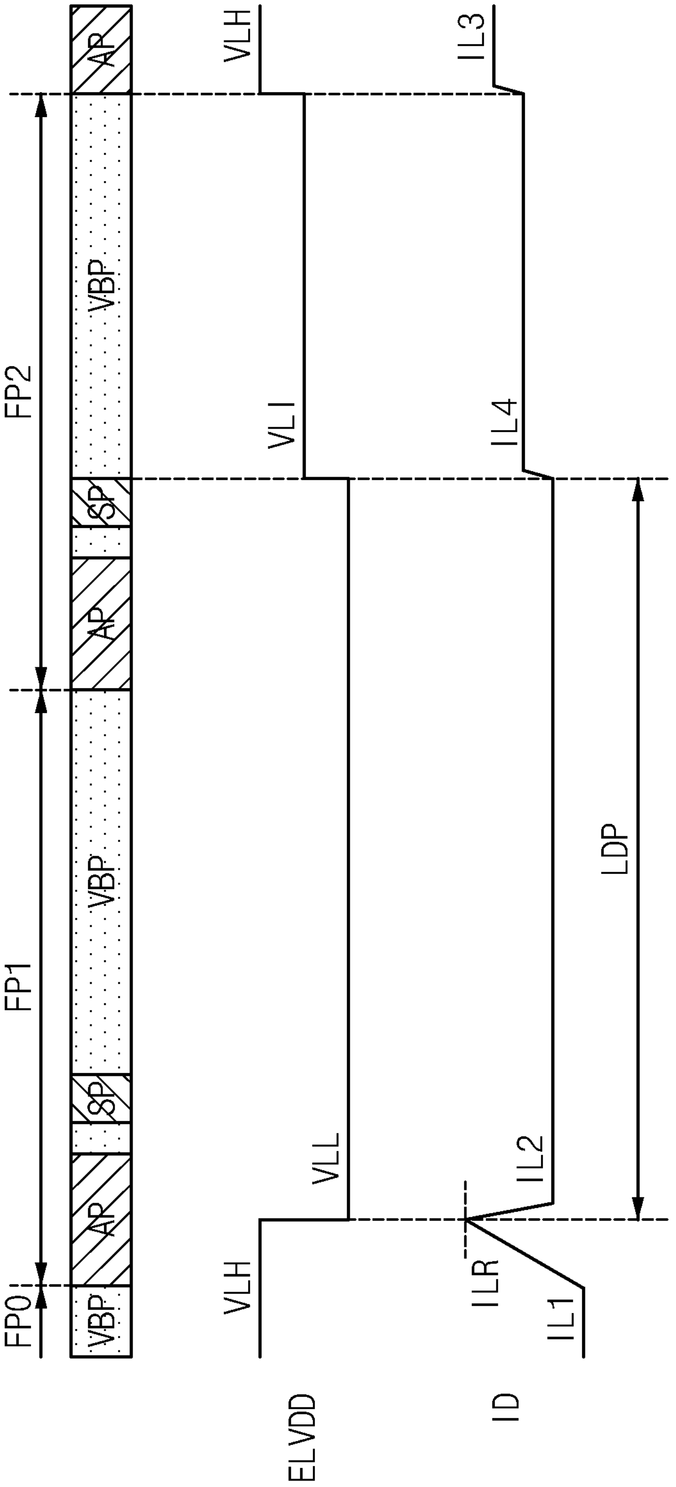

FIG. 9 is a block diagram illustrating a driving voltage controller 280 according to an embodiment. FIGS. 10 and 11 are timing diagrams illustrating a driving voltage ELVDD and a driving current ID according to an embodiment.

Referring to FIGS. 9, 10, and 11, the driving voltage controller 280 may include an overcurrent detector 281, a load calculator 282, a sensing period detector 283, and a driving voltage code generator 284.

The overcurrent detector 281 may detect the driving current ID of the display panel 110. The overcurrent detector 281 may generate the alert signal AS when the driving current ID is greater than the reference current IR.

The load calculator 282 may calculate the load LD of the input image data IMD1 in response to the alert signal AS. The load calculator 282 may generate the load escape signal LES when the load LD is greater than the reference load LR.

The sensing period detector 283 may detect a sensing period SP in the vertical blank period VBP in response to the alert signal AS. The sensing period detector 283 may generate a sensing end signal STS when the sensing period SP ends.

When the alert signal AS is generated by the overcurrent detector 281 in the first frame period FP1, the vertical blank period VBP including the sensing period SP detected by the sensing period detector 283 may be included in the second frame period FP2 following the first frame period FN. For example, when the overcurrent detector 281 detects a driving current ID greater than the reference current IR in the active period AP of the first frame period FP1 and generates the alert signal AS, the sensing period detector 283 may detect the sensing period SP included in the vertical blank period VBP of the second frame section FP2, and may generate the sensing end signal STS.

The driving voltage code generator 284 may generate a driving voltage code VDC for decreasing the driving voltage ELVDD in response to the alert signal AS. The driving voltage generator 170 may decrease the driving voltage ELVDD from the high voltage level VLH to the low voltage level VLL based on the driving voltage code VDC generated in response to the alert signal AS.

The driving voltage code generator 284 may generate a driving voltage code VDC for increasing the driving voltage ELVDD in response to the load escape signal LES and the sensing end signal STS. The driving voltage generator 170 may increase the driving voltage ELVDD based on the driving voltage code VDC generated in response to the load escape signal LES and the sensing end signal STS. When the driving voltage ELVDD increases, the driving current ID may increase.

In an embodiment, as illustrated in FIG. 10, the driving voltage generator 170 may increase the driving voltage ELVDD from the low voltage level VLL to the high voltage level VLH based on the driving voltage code VDC generated in response to the load escape signal LES and the sensing end signal STS. In other words, the driving voltage generator 170 may increase the driving voltage ELVDD from the low voltage level VLL to the high voltage level VLH in one step. When the driving voltage ELVDD increases from the low voltage level VLL to the high voltage level VLH, the driving current ID may increase from the second current level IL2 to the third current level IL3.

In another embodiment, as illustrated in FIG. 11, the driving voltage generator 170 may increase the driving voltage ELVDD from the low voltage level VLL to the intermediated voltage level VLI based on the driving voltage code VDC generated in response to the load escape signal LES and the sensing end signal STS, and may increase the driving voltage ELVDD from the intermediate voltage level VLI to the high voltage level VLH when the vertical blank period VBP of the second frame period FP2 ends. In other words, the driving voltage generator 170 may increase the driving voltage ELVDD from the low voltage level VLL to the high voltage level VLH in two steps. When the driving voltage ELVDD increases from the low voltage level VLL to the intermediate voltage level VLI and then increases to the high voltage level VLH, the driving current ID may increase from the second current level IL2 to the fourth current level IL4, and then may increase to the third current level IL3.

In the driving voltage controller 280 according to the embodiment described with reference to FIGS. 9 to 11, the driving voltage ELVDD may increase when the sensing period PS of the second frame period FP2 ends after the driving voltage ELVDD decreases, so that the length of the luminance decreased period LDP may be constant regardless of the length of the vertical blank period VBP, which is altered according to the refresh rate, and the length of the luminance decreased period LDP may not excessively increase. Accordingly, quality of the image displayed by the display device 100 may be improved. Further, the driving voltage ELVDD may increase after the sensing period PS of the second frame period FP2 ends, so that the change in the driving voltage ELVDD may not affect the sensing operation of the sensing circuit 140 performed during the sensing period PS.

Figure 12:
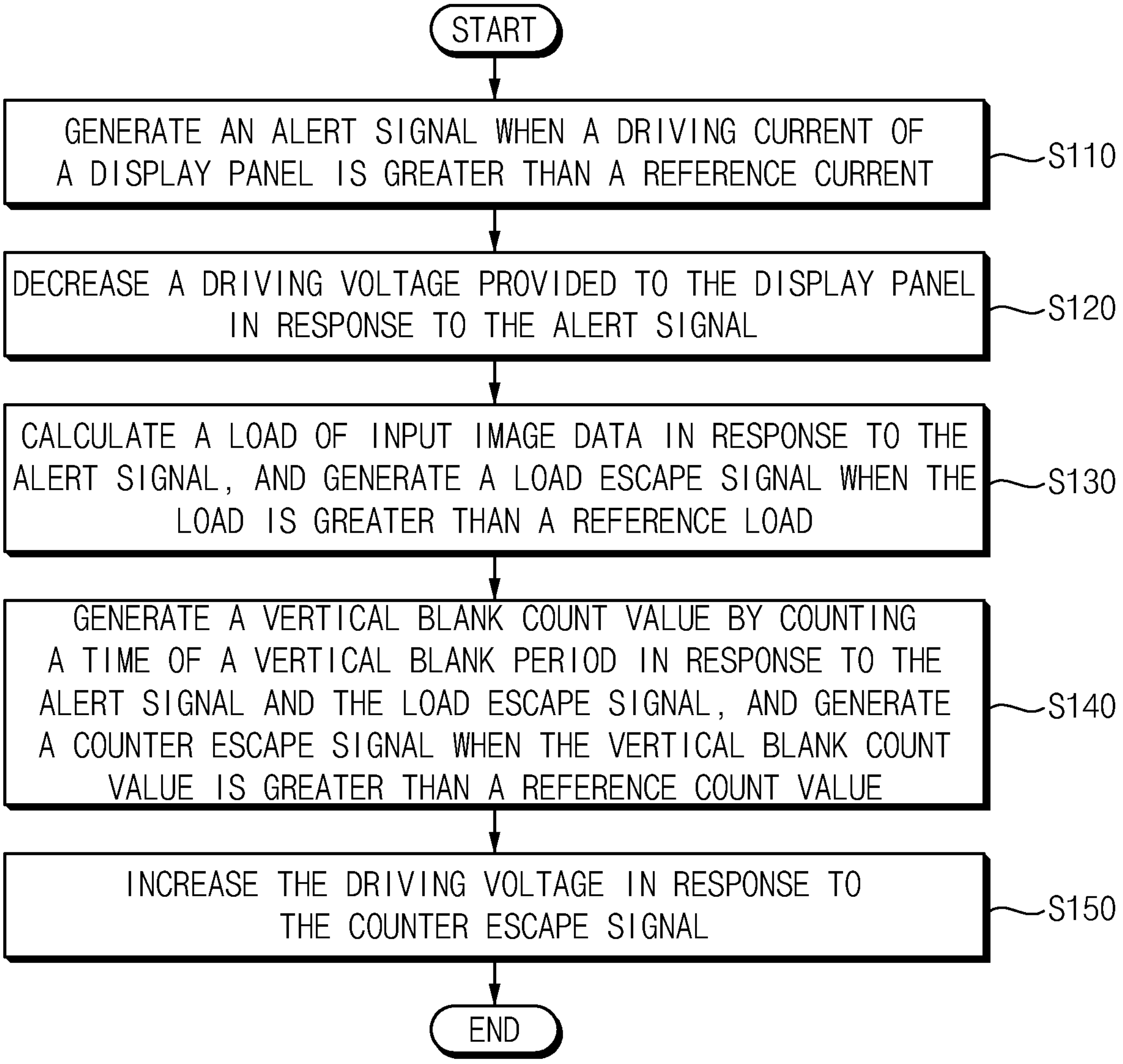
FIG. 12 is a flowchart illustrating a method of driving a display device according to an embodiment.

FIG. 12 is a flowchart illustrating a method of driving a display device according to an embodiment. FIG. 12 may illustrate a method of driving a display device including the driving voltage controller 180 described with reference to FIGS. 6 to 8.

Referring to FIGS. 6 to 8 and 12, in a method of driving a display device according to an embodiment, the overcurrent detector 181 may generate the alert signal AS when the driving current ID of the display panel 110 is greater than the reference current IR (S110).

The driving voltage generator 170 may decrease the driving voltage ELVDD provided to the display panel 110 in response to the alert signal AS (S120). The driving voltage code generator 184 may generate a driving voltage code VDC for decreasing the driving voltage ELVDD in response to the alert signal AS, and the driving voltage generator 170 may decrease the driving voltage ELVDD based on the driving voltage code VDC generated in response to the alert signal AS.

The load calculator 182 may calculate the load LD of the input image data IMD1 in response to the alert signal AS, and may generate the load escape signal LES when the load LD is greater than the reference load LR (S130).

The vertical blank counter 183 may generate the vertical blank count value by counting the time of the vertical blank period VBP in response to the alert signal AS and the load escape signal LES, and may generate the counter escape signal CES when the vertical blank count value is greater than the reference count value CR (S140). When the alert signal AS is generated by the overcurrent detector 181 in the first frame period FP1, the vertical blank period VBP counted by the vertical blank counter 183 may be included in the second frame period FP2 following the first frame period FP1.

The driving voltage generator 170 may increase the driving voltage ELVDD in response to the counter escape signal CES (S150). The driving voltage code generator 184 may generate a driving voltage code VDC for increasing the driving voltage ELVDD in response to the counter escape signal CES, and the driving voltage generator 170 may increase the driving voltage ELVDD based on the driving voltage code VDC generated in response to the counter escape signal CES.

Figure 13:
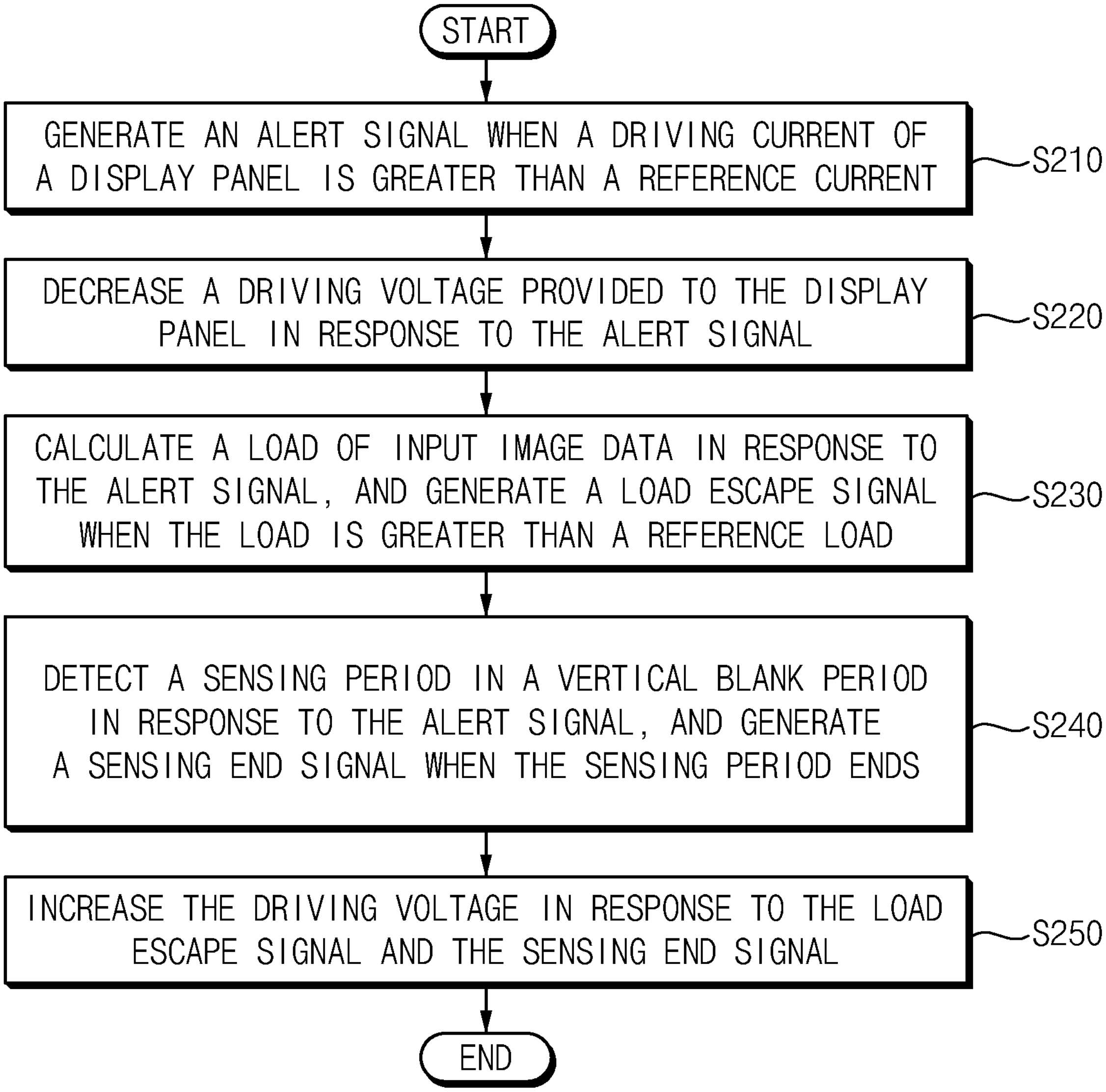
FIG. 13 is a flowchart illustrating a method of driving a display device according to an embodiment.

FIG. 13 is a flowchart illustrating a method of driving a display device according to an embodiment. FIG. 13 may illustrate a method of driving a display device including the driving voltage controller 280 described with reference to FIGS. 9 to 11.

Referring to FIGS. 9 to 11 and 13, in a method of driving a display device according to an embodiment, the overcurrent detector 281 may generate the alert signal AS when the driving current ID of the display panel 110 is greater than the reference current IR (S210).

The driving voltage generator 170 may decrease the driving voltage ELVDD provided to the display panel 110 in response to the alert signal AS (S220). The driving voltage code generator 284 may generate a driving voltage code VDC for decreasing the driving voltage ELVDD in response to the alert signal AS, and the driving voltage generator 170 may decrease the driving voltage ELVDD based on the driving voltage code VDC generated in response to the alert signal AS.

The load calculator 282 may calculate the load LD of the input image data IMD1 in response to the alert signal AS, and may generate the load escape signal LES when the load LD is greater than the reference load LR (S230).

The sensing period detector 283 may detect the sensing period SP in the vertical blank period VBP of the second frame period FP2 in response to the alert signal AS, and may generate the sensing end signal STS when the sensing period SP ends (S240). When the alert signal AS is generated by the overcurrent detector 281 in the first frame period FP1, the vertical blank period VBP including the sensing period SP detected by the sensing period detector 283 may be included in the second frame period FP2 following the first frame period FP1.

The driving voltage generator 170 may increase the driving voltage ELVDD in response to the load escape signal LES and the sensing end signal STS (S250). The driving voltage code generator 284 may generate a driving voltage code VDC for increasing the driving voltage ELVDD in response to the load escape signal LES and the sensing end signal STS, and the driving voltage generator 170 may increase the driving voltage ELVDD based on the driving voltage code VDC generated in response to the load escape signal LES and the sensing end signal STS.

The display device according to the embodiments may be applied to a display device included in a computer, a notebook, a mobile phone, a smart phone, a smart pad, a PMP, a PDA, an MP3 player, or the like.

Although the display devices and the methods of driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a display panel displaying an image based on output image data which is converted input image data, and including a plurality of pixels;

a driving voltage controller including:

an overcurrent detector generating an alert signal when a driving current of the display panel is greater than a reference current, a load calculator calculating a load of the input image data in response to the alert signal and generating a load escape signal when the load is greater than a reference load, and a vertical blank counter generating a vertical blank count value by counting a time of a vertical blank period of a frame period that includes an active period and the vertical blank period in response to the alert signal and the load escape signal, and generating a counter escape signal when the vertical blank count value is greater than a reference count value; and a driving voltage generator decreasing a driving voltage provided to the display panel from a high voltage level to a low voltage level in response to the alert signal, and increasing the driving voltage in response to the counter escape signal, wherein, when the alert signal is generated in a first frame period, the vertical blank period is included in a second frame period following the first frame period.

2. The display device of claim 1, wherein a length of the vertical blank period is altered according to a refresh rate of the display panel.

3. The display device of claim 1, wherein the driving voltage generator increases the driving voltage from the low voltage level to the high voltage level in response to the counter escape signal.

4. The display device of claim 1, wherein the driving voltage generator increases the driving voltage from the low voltage level to an intermediate voltage level between the low voltage level and the high voltage level in response to the counter escape signal, and increases the driving voltage from the intermediate voltage level to the high voltage level when the vertical blank period ends.

5. The display device of claim 1, wherein the driving voltage controller further includes: a driving voltage code generator generating a driving voltage code for decreasing the driving voltage in response to the alert signal, and generating the driving voltage code for increasing the driving voltage in response to the counter escape signal.

6. The display device of claim 5, wherein the vertical blank counter detects a start of the vertical blank period based on a data enable signal.

7. The display device of claim 1, further comprising:

a power controller calculating the load of the input image data, and calculating a scale factor based on the load; and a timing controller generating the output image data by scaling grayscale values of the input image data using the scale factor.

8. The display device of claim 7, wherein the power controller calculates the scale factor based on a load of input image data in a first frame period, and wherein the timing controller scales grayscale values of input image data in a second frame period following the first frame period using the scale factor.

9. The display device of claim 1, wherein the driving current is a sum of currents flowing through light emitting elements respectively included in the pixels, and wherein the driving voltage is provided to the light emitting elements.

10. A display device, comprising:

a display panel displaying an image based on output image data which is converted input image data, and including a plurality of pixels;

a driving voltage controller including:

an overcurrent detector generating an alert signal when a driving current of the display panel is greater than a reference current, a load calculator calculating a load of the input image data in response to the alert signal and generating a load escape signal when the load is greater than a reference load, a sensing period detector detecting a sensing period in a vertical blank period of a frame period that includes an active period and the vertical blank period in response to the alert signal, and generating a sensing end signal when the sensing period ends; and a driving voltage generator decreasing a driving voltage provided to the display panel from a high voltage level to a low voltage level in response to the alert signal, and increasing the driving voltage in response to the load escape signal and the sensing end signal, wherein, when the alert signal is generated in a first frame period, the vertical blank period is included in a second frame period following the first frame period.

11. The display device of claim 10, wherein a length of the vertical blank period is altered according to a refresh rate of the display panel.

12. The display device of claim 10, wherein the driving voltage generator increases the driving voltage from the low voltage level to the high voltage level in response to the load escape signal and the sensing end signal.

13. The display device of claim 10, wherein the driving voltage generator increases the driving voltage from the low voltage level to an intermediate voltage level between the low voltage level and the high voltage level in response to the load escape signal and the sensing end signal, and increases the driving voltage from the intermediate voltage level to the high voltage level when the vertical blank period ends.

14. The display device of claim 10, wherein the driving voltage controller further includes:

a driving voltage code generator generating a driving voltage code for decreasing the driving voltage in response to the alert signal, and generating the driving voltage code for increasing the driving voltage in response to the load escape signal and the sensing end signal.

15. The display device of claim 10, further comprising:

a sensing circuit measuring sensing currents of the pixels during the sensing period.

16. A method of driving a display device, the method comprising:

generating an alert signal when a driving current of a display panel is greater than a reference current;

decreasing a driving voltage provided to the display panel in response to the alert signal;

calculating a load of input image data in response to the alert signal, and generating a load escape signal when the load is greater than a reference load;

generating a vertical blank count value by counting a time of a vertical blank period of a frame period that includes an active period and the vertical blank period in response to the alert signal and the load escape signal, and generating a counter escape signal when the vertical blank count value is greater than a reference count value; and increasing the driving voltage in response to the counter escape signal, wherein, when the alert signal is generated in a first frame period, the vertical blank period is included in a second frame period following the first frame period.

17. The method of claim 16, wherein a length of the vertical blank period is altered according to a refresh rate of the display panel.

* * * * *